US009635172B2

(12) United States Patent
Chiu

(10) Patent No.: US 9,635,172 B2
(45) Date of Patent: Apr. 25, 2017

(54) SELECTIVE VOICE COMMUNICATION AMONG MULTIPLE SERVICES

(75) Inventor: Shin Cheung Simon Chiu, Palo Alto, CA (US)

(73) Assignee: TP Lab Inc., Palo Alto, CA (US)

( * ) Notice: Subject to any disclaimer, the term of this patent is extended or adjusted under 35 U.S.C. 154(b) by 2516 days.

(21) Appl. No.: 11/403,730

(22) Filed: Apr. 13, 2006

(65) Prior Publication Data

US 2007/0263816 A1   Nov. 15, 2007

(51) Int. Cl.
*H04M 3/42* (2006.01)
*H04M 7/00* (2006.01)

(52) U.S. Cl.
CPC ..... *H04M 3/42229* (2013.01); *H04M 7/0024* (2013.01)

(58) Field of Classification Search
CPC ............. H04Q 2213/13138; H04Q 2213/1325
USPC ..... 379/221.02, 114.01, 114.02, 219, 220.01
See application file for complete search history.

(56) References Cited

U.S. PATENT DOCUMENTS

| | | | |
|---|---|---|---|
| 5,530,744 A * | 6/1996 | Charalambous et al. | 379/266.08 |
| 5,559,855 A * | 9/1996 | Dowens et al. | 379/52 |
| 6,069,946 A * | 5/2000 | Lieuwen | 379/211.01 |
| 6,535,596 B1 * | 3/2003 | Frey et al. | 379/201.01 |
| 6,597,686 B1 * | 7/2003 | Smyk | H04L 12/6418 370/252 |
| 6,707,811 B2 * | 3/2004 | Greenberg et al. | 370/352 |
| 6,707,901 B1 * | 3/2004 | Hodges et al. | 379/221.09 |
| 6,779,020 B1 * | 8/2004 | Henrick | 709/206 |
| 6,907,031 B1 * | 6/2005 | Ehlinger | H04L 45/22 370/254 |
| 7,092,508 B2 * | 8/2006 | Brown et al. | 379/265.06 |
| 7,130,405 B2 * | 10/2006 | Brown et al. | 379/210.02 |
| 7,158,620 B2 * | 1/2007 | Kobrosly et al. | 379/114.02 |
| 7,162,237 B1 * | 1/2007 | Silver et al. | 455/432.3 |
| 7,260,208 B2 * | 8/2007 | Cavalcanti | 379/221.01 |
| 7,376,411 B2 * | 5/2008 | Thommana et al. | 455/405 |
| 7,433,455 B1 * | 10/2008 | Oran | 379/201.01 |
| 7,571,249 B2 * | 8/2009 | Wu | H04M 3/42374 709/203 |
| 7,761,095 B2 * | 7/2010 | Best et al. | 455/427 |
| 8,081,745 B2 * | 12/2011 | Burrell | H04L 12/1895 379/201.1 |

(Continued)

*Primary Examiner* — William Deane, Jr.
(74) *Attorney, Agent, or Firm* — Timothy X. Gibson, Esq.; Gibson & Dernier LLP

(57) ABSTRACT

When a voice call is made between two users (Caller and Callee), both of which may have access to multiple voice communication services, the connection is made automatically by the communication equipment through a selectable communication service, based upon characteristics of connection. Those characteristics may include the services available to the users, the day of the week, the time of day, the availability of the Callee on a service, the geographic locations of the Caller and Callee, and Caller pre-established service preferences. Preferably, Caller preferences and associations of callees with unique destination identifiers are stored in a database created for the Caller and available to his communication equipment. An ultimate callee identifier selected for a particular call includes an indication of communication service, and connection an appropriate interface for that service is then provided automatically for the Caller.

16 Claims, 4 Drawing Sheets

(56) References Cited

U.S. PATENT DOCUMENTS

| | | | |
|---|---|---|---|
| 8,407,764 B2* | 3/2013 | Kang | H04L 63/08 |
| | | | 726/3 |
| 8,605,869 B1* | 12/2013 | Mobarak et al. | 379/88.17 |
| 8,856,359 B2* | 10/2014 | Guedalia | H04L 29/06027 |
| | | | 709/220 |
| 2001/0038689 A1* | 11/2001 | Liljestrand et al. | 379/201.03 |
| 2003/0235287 A1* | 12/2003 | Margolis | 379/265.01 |
| 2004/0042414 A1* | 3/2004 | Bouret et al. | 370/252 |
| 2004/0053573 A1* | 3/2004 | Karusawa | 455/41.2 |
| 2004/0083291 A1* | 4/2004 | Pessi | H04L 65/605 |
| | | | 709/227 |
| 2004/0136363 A1* | 7/2004 | Gass | H04L 29/06 |
| | | | 370/352 |
| 2004/0249910 A1* | 12/2004 | Jerbi et al. | 709/222 |
| 2006/0039397 A1* | 2/2006 | Hari et al. | 370/431 |
| 2007/0165641 A1* | 7/2007 | Fitchett et al. | 370/392 |
| 2012/0157068 A1* | 6/2012 | Eichen | H04W 4/16 |
| | | | 455/417 |
| 2015/0207847 A1* | 7/2015 | Kim | H04L 65/1083 |
| | | | 709/204 |
| 2016/0150089 A1* | 5/2016 | Garg | H04M 7/003 |
| | | | 370/352 |

* cited by examiner

SELECTIVE VOICE COMMUNICATION AMONG MULTIPLE SERVICES

BACKGROUND OF THE INVENTION

The present invention relates generally to telecommunications and, more specifically, it concerns a system permitting service selective voice communication among users who have different communication services available.

Residential telephone service allows a caller to make a call to a callee by dialing a telephone number that is associated with the callee. For example, if a telephone number "510-222-5555" belongs to John; a caller can call John by dialing "510-222-5555" using a telephone.

However, today virtually every user has multiple voice communication services available, including: cellular telephone services; Voice over IP (VoIP) telephone services (e.g., Vonage service or Skype service); and Instant Messenger (IM) based voice services (e.g., Yahoo Messenger voice service, GoogleTalk service, or Internet Gaming). Thus, there may be multiple ways to call John on his telephone.

In addition to the conventional telephone service described above, other possibilities may exist. If John subscribes to an IM based voice service with a user name "turtleneck2046", a caller who also subscribes to the same service can call John using his user name "turtleneck2046" through a personal computer. A caller who subscribes to an IM based voice service that supports outgoing calls to the Public Switched Telephone Network (PSTN) can call John's telephone using the IM based voice service through a personal computer, a smartphone, or a PDA.

There are many ways to reach a business. For example, Honest Pizza owns multiple telephone numbers, including a toll-free telephone number, and subscribes to multiple IM based voice services. A caller can call Honest Pizza by using any of the telephone numbers or user names associated with Honest Pizza.

From another perspective, a telephone that connects to multiple voice services provides unprecedented convenience to a caller. A caller can use the telephone to make a call to a callee using any of the multiple voice services. So, the telephone can connect to: a cellular telephone service or a residential telephone service; a VoIP telephone service and a residential telephone service; multiple VoIP telephone services and multiple IM based voice services.

However, this unprecedented convenience also presents overwhelming complexity for a caller to master. When Eva uses the telephone to call John, she oftentimes does not care about which voice service is used to make the call. In another scenario, Eva's telephone connects to five voice services; and John can receive a call from only two of the voice services. For example, Eva's telephone connects to a residential telephone service, a VoIP telephone service, and three IM based voice services. John owns a cell phone and does not subscribe to the three IM based voice services. When Eva uses the telephone to call John, she will have to select the residential service or the VoIP telephone service to make the call. Choosing the wrong voice service will result in call failure.

There is therefore a need to provide a solution, such that a caller need not choose a service when calling a callee.

SUMMARY OF THE INVENTION

In accordance with the present invention, when a voice call is made between two users (Caller and Callee), both of which may have access to multiple voice communication services, the connection is made automatically by the communications equipment through a selectable communication service, based upon characteristics of connection. Those characteristics may include the services available to the users, the day of the week, the time of day, the availability of the Callee on a service, the geographic locations of the Caller and Callee, and Caller pre-established service preferences. Preferably, Caller preferences and associations of callees with unique destination identifiers are stored in a database created for the Caller and available to his communication equipment. An ultimate callee identifier selected for a particular call includes an indication of communication service, and connection an appropriate interface for that service is then provided automatically for the Caller.

BRIEF DESCRIPTION OF DRAWINGS

The forgoing brief description, and further objects, features and advantages of the present invention will be understood more completely from the following detailed description of presently preferred embodiments, with reference being had to the accompanying drawing, in which.

DETAILED DESCRIPTION OF THE PREFERRED EMBODIMENTS

Figure 1:
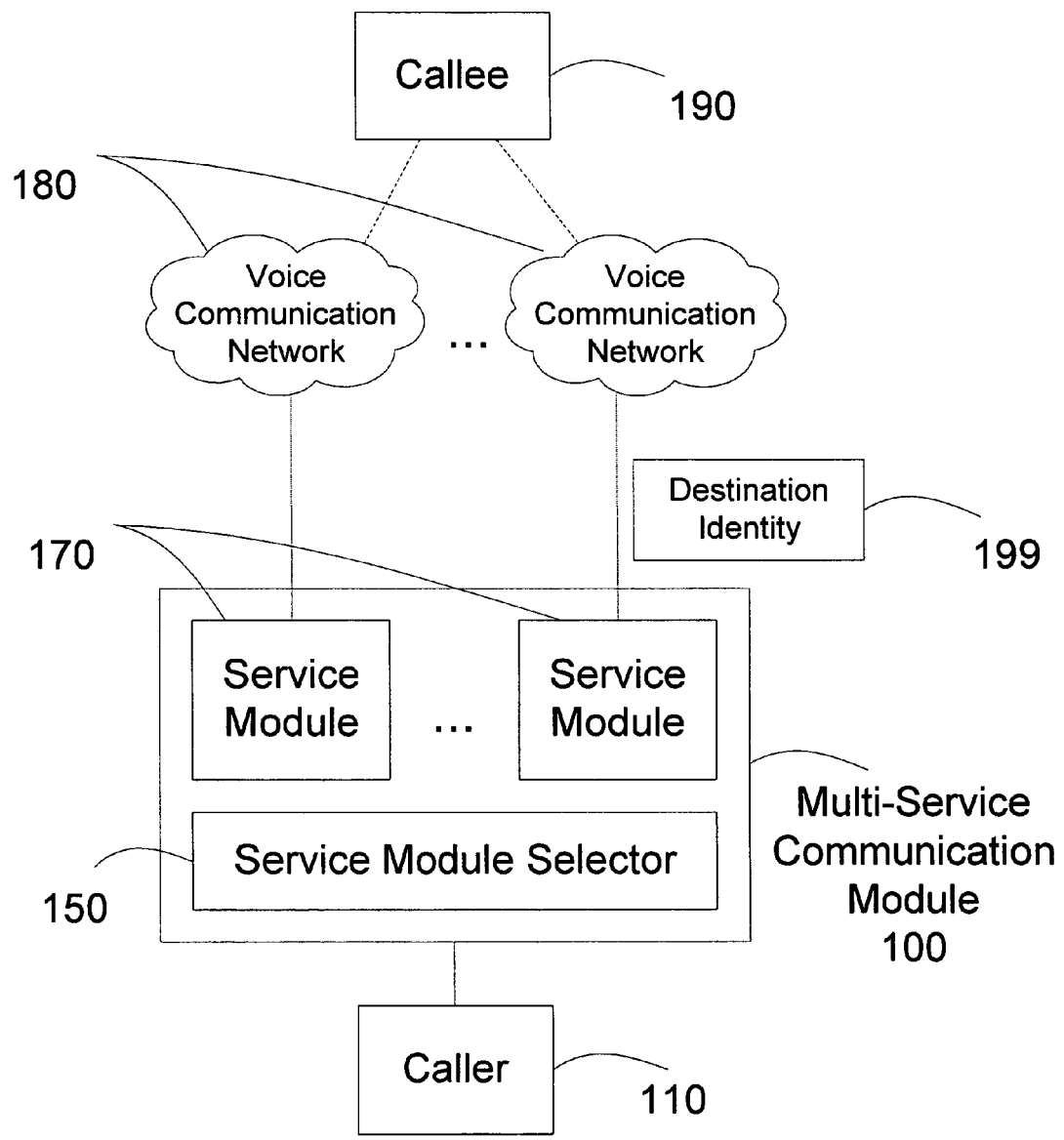
FIG. 1 is a functional block diagram illustrating how selected voice communication is achieved among multiple services in accordance with a preferred embodiment of the present invention.

FIG. 1 is a functional block diagram illustrating how selected voice communication is achieved among multiple communication services in accordance with a preferred embodiment of the present invention. A Caller 110 wishes to communicate with a Callee 190 by voice. It will be assumed that both of them have access to multiple voice communication services. Caller 110 places his call through Multi-Service Communication Module 100 which associates a destination identify 199 with Callee 190. Voice Communication Networks 180 preferably represent all available voice communication services, and Multi-Service Communication Module 100 is capable of accessing every one of these services. However, those skilled in the art will appreciate that there may be instances in which only a subset of all services will be provided. Multi-Service Communication Module 100 is programmed to be aware of all voice communication services available to Caller 110 and Callee 190 and is programmed or can be instructed by Caller 110 to utilize a particular one of Voice Communication Networks 180 under a particular circumstances arising between Caller 110 and Callee 190. After Multi-Service Communication Module 100 makes the selection, the message from Caller 110 is sent to the appropriate one of voice communication networks 180, and therethrough, to Callee 190.

As explained above, Multi-Service Communication Module 100 provides connectivity of caller 110 to a plurality of Voice Communication Networks 180. Examples of such Voice Communication Network includes the Public Switched Telephone Network (PSTN); a cellular network; a corporate telephone network; an Internet Protocol (IP) network; the Internet; a corporate Virtual Private Network (VPN); a Voice over IP (VoIP) network; an IP-based application network that supports a voice call, such as a gaming network, an Instant Message (IM) based network, a corporate collaboration network, or a home network; a walkie-talkie network; a satellite network; and a push-to-talk network. However, those skilled in the art will appreciate that connectivity could be provided to any kind of network, including ones yet to be developed.

Multi-Service Communication Module 100 includes a plurality of Service Modules 170, each including the functionality required to interface with a connected Voice Communication Network. It will be appreciated that modules 170 could each be dedicated to a particular type of network from among networks 180, or they could be programmable, or they could be adaptive. Making a voice call includes sending voice call setup messages to the connected Voice Communication Network to establish a voice communication between Multi-Service Communication Module 100 and the connected Voice Communication Network. For example, the voice call setup messages could include a Plain Old Telephone Service (POTS) offhook signal to the PSTN. Alternatively, the voice call setup messages includes a SIP INVITE message described in IETF RFC 3261 "SIP: Session Initiation Protocol" to a VoIP network; a call initiation message to a cellular network; or an alert signal to a walkie-talkie network.

A Service Module could also include: a telephone application and a Foreign Exchange Office (FXO) interface that connects to a telephone switch in the Public Switched Telephone Network (PSTN); a mobile telephone application and a Radio Frequency (RF) interface that connects to a wireless base station in a cellular network; a VoIP application and an IP interface that connects to a Voice over IP (VoIP) server over the Internet; an Instant Messenger (IM) based voice application and an IP interface that connects to a voice server of an IM based voice service over the Internet; a corporate voice application and an IP interface that connects to an Internet Protocol Private Branch Exchange (IP-PBX) over an IP network, such as a corporate Virtual Private Network (VPN), or a corporate VoIP network; a telephone application, and a proprietary digital phone interface or an FXO interface that connects to a Private Branch Exchange (PBX) in a corporate telephone network; a push-to-talk application, and a Radio Frequency (RF) interface that connects to a wireless base station in a push-to-talk network; or a walkie-talkie application, and a Radio Frequency (RF) interface that connects to a walkie-talkie network.

A Service Module uses a Destination Identity, associated with Callee 190, to make a voice call over the connected. Voice Communication Network. One type of Destination Identity is a public telephone number such as "408-222-3333". Alternatively, a Destination Identity could be: a user name of an IM based voice service such as "dragonfly225" of Yahoo Messenger voice service; a corporate extension number of a corporate voice service, such as an extension number "2019"; a radio frequency used in a walkie-talkie network, such as 27.145 MHz, or 49.860 MHz; or an identity for a push-to-talk service, such as a user name "randylee-oaklandhigh-class1985".

Service Modules are specific to a particular communication service and can use a Destination Identity to make a voice call. For example, a Service Module that connects to an IM based network can use a user name "dragonfly225" to make a voice call. Alternatively, a Service Module that connects to PSTN can use a telephone number "650-222-3333" to make a voice call; a Service Module that connects to a cellular network can use the telephone number "650-222-3333" to make a voice call; and a third Service Module that connects to a VoIP network can use the telephone number "650-222-3333" to make a voice call.

A Callee represents a person, a member of a group, a business, an organization, a department of an organization, or a government agency. Examples for a Callee are "David Sanders", "Honest Pizza", "Lincoln Hospital", "Planning Commission of City of Northland", or "John Miller of Rotary Club, Palo Alto Chapter." A Callee could correspond to a plurality of Destination Identities. For example, Callee 190, "Ronnie Weitzel", could correspond to telephone number "408-222-3333", user name "dragonfly225", telephone number "650-333-2018", and radio frequency 49.860 MHz.

Multi-Service Communication Module 100 includes a Service Module Selector 150, which selects a Service Module from among the plurality of Service Modules 170; and it stores a Destination Identity 199 for making a voice call to Callee 190 for Caller 110. Through Module Selector 150, Multi-Service Communication Module 100 invokes the selected Service Module, which makes a voice call over the selected Voice Communication Network using Destination Identity 199.

Figure 2:
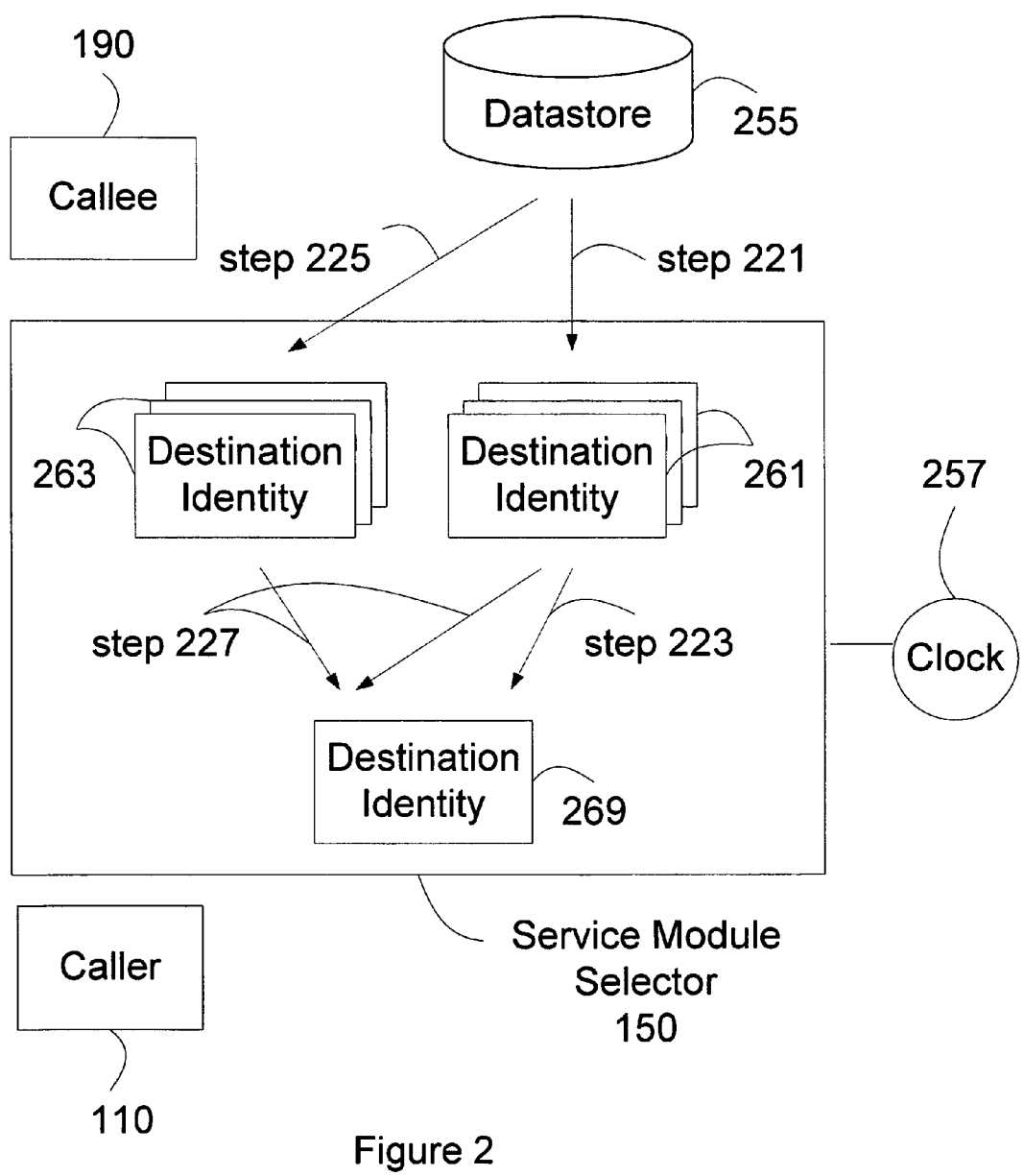
FIG. 2 is a schematic block diagram illustrating a preferred process performed by the communication equipment to select a destination identity for a callee when a caller makes an outgoing voice call.

FIG. 2 is a schematic block diagram illustrating a preferred process performed by Service Module Selector 150 to select a Destination Identity when Caller 110 makes an outgoing voice call by accessing a data in Datastore 255. The Multi-Service Communication Module may include Datastore 255. Basically, Service Module Selector 150 has access to a database which associates Destination Identities with Callees. Those skilled in the art will appreciate that if Datastore 255 is part of the Service Module Selector 150 used by Caller 110, it could include a database or databases for all users of that selector module. On the other hand, it will also be appreciated that Datastore 255 could be accessed by Service Module Selector 150 through a network, in which case it could contain databases associated with all users in a defined area.

Service Module Selector 150 may select a Destination Identity in multiple steps, for example, in step 221 Service Module Selector 150 obtains from Datastore 255 a plurality of Destination Identities 261 that match to Callee 190. Then in a step 223, Service Module Selector 150 selects a Destination Identity 269 from among the plurality of Destination Identities 261.

A Destination Identity could be associated with a destination type. For example, a destination type could indicate that the associated Destination Identity is for home use, or for business use. So, if the current time of day is between 8 am and 6 pm on a business day, Service Module Selector 150 selects, from the plurality of Destination Identities 261, that Destination Identity 269 that is associated with a destination type indicating business usage. Service Module Selector 150 could connect to a Clock 257, indicating the current time of day. Similarly, if the current time of day is between 6 pm and 8 am, Service Module Selector 150 could select from the plurality of Destination Identities 261 that Destination Identity 269 associated with a destination type indicating home usage. Those skilled in the art will appreciate that the times are merely exemplary and that a caller could provide his own criteria.

A Destination Identity could also be associated with a destination preference ranking. For example, a destination preference ranking could include an integer, such as "7", "8", "39" or "5093". As a further example, the plurality of Destination Identities 261 could include a telephone number "408-222-3333" with a destination preference ranking of "12", a Yahoo Messenger user name "dragonfly225" with a destination preference ranking of "8", and a telephone number "650-321-6517" with a destination preference ranking of "7". Service Module Selector 150 selects from the plurality of Destination Identities 261 the Destination Identity 269 ("408-222-333") with the highest destination preference ranking of "12". Of course, such rankings could be programmed by the caller, or there could be a default set.

A Destination Identity could also be associated with a destination's availability, that is, the availability of the associated Destination Identity. For example, a destination availability has a value of "available", indicating that the associated Destination Identity is available.

When a Destination Identity is a user name for an IM based voice service, such as user name "johnsmith2006" for Yahoo Messenger voice service, the destination availability associated with the Destination Identity could include the presence status for user name "johnsmith2006' on the service. For example, the presence status for user name "johnsmithe2006" could be "present" and the destination availability has a value of "available", indicating that the Destination Identity is available. As an example, Multi-Service Communication Module 100 could obtain presence status from a presence server of the IM based voice service, and obtains the destination availability of the Destination Identity.

When a Destination Identity is a mobile telephone number for a cellular telephone service, such as mobile telephone number "408-987-0123", the destination availability of the Destination Identity includes the mobility registration status for mobile telephone number "408-987-0123". For example, the mobility registration status for that number might be "registered" and the destination availability could have a value of "available", indicating that the Destination Identity is available. Preferably, the Multi-Service Communication Module obtains the registration status from a Home Location Register (HLR) that serves the mobile telephone number.

When a Destination Identity is the user name of a push-to-talk service such as user name "randylee-oaklandhigh-class1985". The destination availability of the Destination Identity includes the service status of the device associated with user name "randylee-oaklandhigh-class1985". For example, the service status for the device could be "logged in" and the destination availability could have a value of "available", indicating that the Destination Identity is available. The Multi-Service Communication Module preferably obtains the service status from a status server of the push-to-talk service; and it obtains the destination availability of the Destination Identity.

Multi-Service Communication Module 100 could obtain the destination availability periodically, for example, every 10 minutes, every 15 minutes, or every 20 minutes. Alternately, the Multi-Service Communication Module could obtain the destination availability when the destination availability that associates with a Destination Identity changes. For example, Multi-Service Communication Module could obtain the destination availability before Service Module Selector 150 selects the Destination Identity.

Multi-Service Communication Module 100 could obtain the destination availability of a Destination Identity over a connected Voice Communication Network. However, it could also obtain the destination availability over a different network, such as the Internet or a corporate Virtual Private Network (VPN).

Service Module Selector 150 selects from the plurality of Destination Identities 261 that Destination Identity 269 that associates with a destination availability having a value of "available". This could be done in multiple steps (e.g. 221, 225, and 227). For example, in step 221, Service Module Selector 150 obtains from Datastore 255 a plurality of Destination Identities 261 that match to Callee 190. A Destination Identity could be selected based on a service module identity. Datastore 255 could include information that matches a service module identity to a plurality of Destination Identities; each matching Destination Identity can be used by the Service Module identified by the service module identity to make a voice call.

In step 225, Service Module Selector 50 selects from Datastore 255 a plurality of Destination Identities 263 that match the service module identity. Datastore 255 includes a configuration record, which includes a preferred service module identity. Service Module Selector 150 uses the preferred service module identity from the configuration record to select the plurality of Destination Identities 263. Datastore 255 includes caller profiles, each associated with a Caller. A caller profile includes a caller preferred service module identity. Service Module Selector 150 uses the caller preferred service module identity from the user profile associated with Caller 110 to select the plurality of Destination Identities 263.

In step 227, Service Module Selector 150 selects Destination Identity 269 such that Destination Identity 269 is included in the plurality of Destination Identities 261 and is included in the plurality of Destination Identities 263.

Figure 3:
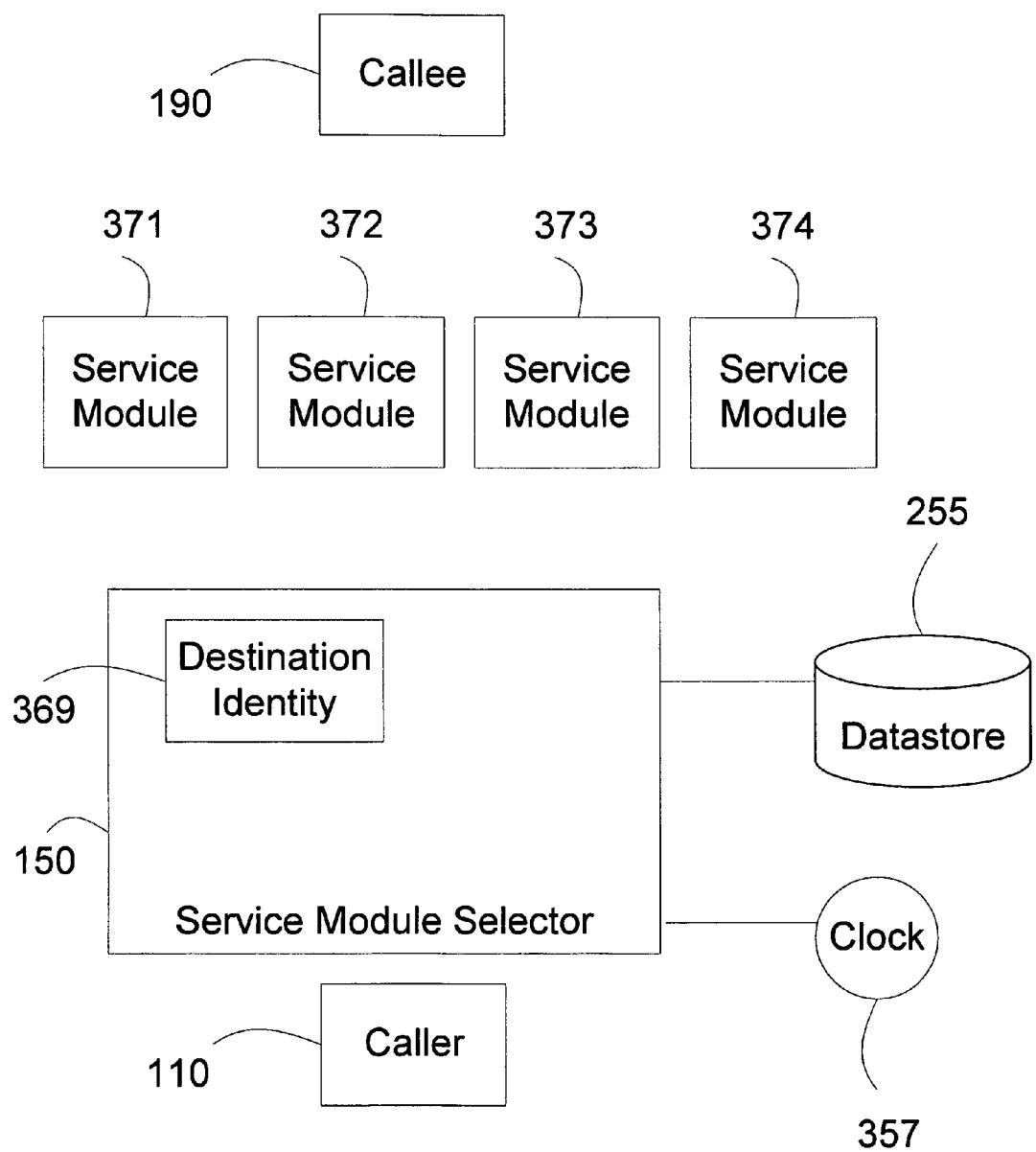
FIG. 3 is a schematic block diagram illustrating a process performed by the communication equipment for selecting a service module for a caller to make an outgoing voice call to a selected callee.

FIG. 3 is a schematic block diagram illustrating a process performed by Service Module Selector 150 for selecting a Service Module for Caller 110 to make an outgoing voice call to a selected caller. Multi-Service Communication Module 100 includes Service Modules 371, 372, 373 and 374. Service Module 371 connects to a residential telephone service; Service Module 372 connects to a cellular telephone service; Service Module 373 connects to a Voice over IP service, such as Vonage service; and Service Module 374 connects to an IM based voice service, such as Yahoo Messenger voice service.

Datastore 255 includes information for Service Modules 371, 372, 373 and 374. A Service Module has an associated service preference ranking, which includes an integer, such as "2", "3", "15" or "21", and Service Module Selector 150 selects the Service Module with the highest service preference ranking. Service Module Selector 150 obtains from Datastore 255 the service preference ranking of Service Modules 371, 372, 373 and 374. For example, Service Module 371 may be associated with a service preference ranking of "15"; Service Module 372 with a service preference ranking of "11"; Service Module 373 with a service preference ranking of "20"; and Service Module 374 associates with a service preference ranking of "18". Service Module Selector 150 selects Service Module 373, the one with the highest service preference ranking of "20".

A Service Module could be associated with a service time period, in which case Service Module Selector 150 selects a Service Module with a service time period such that the current time of day indicated by Clock 357 is within the service time period. Service Module Selector 150 obtains from Datastore 255 service time periods for Service Modules 371, 372, 373 and 374. For example, suppose Service Module 371 is associated with service time period of "7:00 am to 9:30 am"; Service Module 372 with a service time period of "9:30 am to 6:30 pm"; Service Module 373 with a service time period of "6:00 pm to 9:30 pm"; and Service Module 374 with a service time period of "9:30 pm to 2:00 am". If the current time of day indicated by Clock 357 is 9:47 pm; Service Module Selector 150 selects Service Module 374 with a service time period of "9:30 pm to 2:00 am".

Service Module Selector 150 could also select a Service Module based on a Destination Identity 369 corresponding to Callee 190. Datastore 355 includes information that matches a Destination Identity to a plurality of Service Modules; each of the matching Service Modules can use the Destination Identity to make a voice call. Service Module Selector 150 uses Destination Identity 369 to obtain from Datastore 255 a plurality of matching Service Modules, and it selects a Service Module from the plurality of matching Service Module.

As an example, a Service Module might be associated with a plurality of geographic locations, such as "local", "local long distance", "continental", "long distance", "international", "Asia", "Europe", "Hong Kong", or "Norway". A Service Module 371 is associated with geographic locations of "local" and "local long distance"; Service Module 372 is associated with a geographic location of "continental"; Service Module 373 is associated with locations of "Hong Kong" and "Korea"; Service Module 374 is associated with the geographic location of "Europe". As a further example, Destination Identity 369 is a local telephone number, such as "326-0127"; Service Module Selector 150 selects Service Module 371 that is associated with a geographic location of "local". Destination Identity 369 is an international telephone number with country code "852". Country code "852" is for the city of Hong Kong; Service Module Selector 150 could select Service Module 373 to associate with a geographic location of "Hong Kong".

Datastore could include a hard disk or a flash memory, which contains the above-mentioned database.

Figure 4:
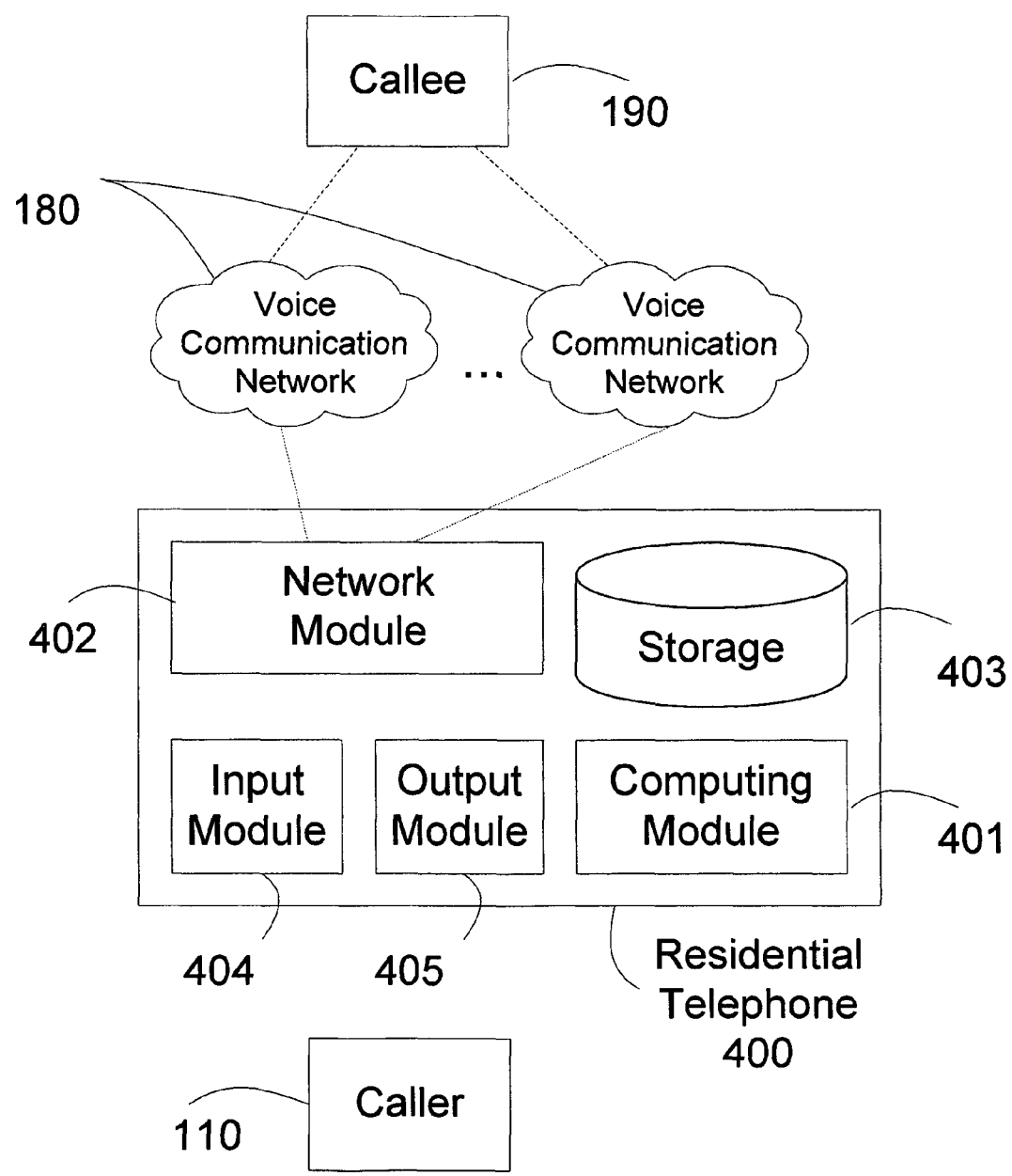
FIG. 4 is a functional block diagram of a telephone 400 that embodies service selective multi-service voice communication in accordance with the present invention.

FIG. 4 is a functional block diagram of a Telephone 400 that embodies selective multi-service voice communication in accordance with the present invention.

Telephone 400 includes a Computing Module 401 that contains programming logic that embodies a Multi-Service Communication Module. Typically, Computing Module 401 includes a processor and associated memory.

Telephone 400 also includes a Network Module 402, which embodies the network interface for a plurality of Service Modules included in the Multi-Service Communication Module. Preferably, Network Module 402 includes an IP interface and an Ethernet interface.

Telephone 400 also includes a Storage 403 that embodies the Datastore 255 of the Multi-Service Communication Module 100. Preferably, Storage 403 includes a hard disk, a flash memory containing a database.

Preferably, the plurality of Voice Communication Networks 180 include the Internet, a Voice over IP network, and an IM based network.

Telephone 400 includes an Input Module 404, which includes the functionality of obtaining user input for a voice call. The user input includes Callee 190. Preferably, Input Module 404 includes a browser that allows a user to browse a directory and to select Callee 190. Input Module 404 obtains the user input from Caller 110 to begin the process of selecting a Destination Identity as illustrated in FIG. 2; and the process of selecting a Service Module as illustrated in FIG. 3. In a preferred embodiment, the user input includes audio input from the user and Input Module 404 includes a microphone.

Telephone 400 includes an Output Module 405, which includes the functionality of transmitting user output for a voice call; preferably, the user output includes audio output to the user. Preferably, Output Module 405 includes a speaker.

Computing Module 401 selects a Service Module and a Destination Identity, and the selected Service Module uses the selected Destination Identity to make a voice call to Callee 190 via Network Module 402.

Preferably, the inclusion of the plurality of Service Modules in the Telephone 400 is achieved during the manufacturing process of Telephone 400, such as by including the hardware or firmware functionalities; or by including the software applications that constitute the plurality of Service Modules. The inclusion could be achieved during a point-of-sale process, such as by activating the applications that constitute the plurality of Service Modules. Alternatively, the inclusion is achieved by a service subscription process that activates the voice communication services associated with the plurality of Service Modules.

If Telephone 400 is a wireless telephone connected to a wireless network, the connected plurality of Voice Communication Networks include a cellular network, WiFi network, push-to-talk network, satellite network or walkie-talkie network. A user uses the wireless telephone to select a Callee. The wireless telephone selects a Destination Identity and a Service Module to make a voice call to the Callee over a connected Voice Communication Network.

If Telephone 400 is a corporate telephone, the connected plurality of Voice Communication Network includes a corporate telephone network, a corporate IP network, or a corporate VPN network. A user uses the corporate telephone to select a Callee. The corporate telephone selects a Destination Identity and a Service Module to make a voice call to the Callee over a connected Voice Communication Network. Preferably, the inclusion of the plurality of Service Modules in the corporate telephone is achieved during the manufacturing process of the corporate telephone, such as by including the hardware or firmware functionalities or by including the software applications that constitute the plurality of Service Modules. Or the inclusion is achieved during an installation process, such as by activating the applications that constitute the plurality of Service Module. The inclusion could also be achieved by a service subscription process that activates the voice communication services associated with the plurality of Service Modules.

Telephone 400 could include a telephone switching system, such as a corporate telephone system, such as a PBX or an IP-PBX. The telephone switching system includes Multi-Service Communication Module. The connected plurality of Voice Communication Network includes corporate telephone network, PSTN, Internet, Voice over IP network, or IM based network. The telephone switching system connects to a terminal. The telephone switching system receives input from the terminal and transmits output to the terminal. A user uses a terminal to select a Callee by, in one embodiment, dialing an extension number of the Callee. The telephone switching system selects a Destination Identity and a Service Module to make a voice call to the Callee over a connected Voice Communication Network.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. In a voice communication system including a plurality of different voice communication services accessible by a caller and a callee, a method for automatically establishing a connection between the caller and the callee over a caller selectable voice communication service, comprising the steps of:

maintaining for a caller, and making available to a communication equipment of the caller, a database associating with each callee a plurality of different voice communication networks accessible by the callee via a single telecommunication device;

including in the database a set of destination identities for each callee, each destination identity being associated with a respective one of the plurality of different voice communication networks accessible by each callee via a single telecommunication device, and further including a caller profile associated with a caller, wherein the caller profile comprises a caller preference;

establishing a set of selection criteria for each destination identity, the selection criteria selected from at least one of: a day of the week, a time of day, a service priority assigned by either the caller or the callee to each of the voice communication networks, and a geographic location of the caller and/or the intended callee;

in response to caller input selecting a callee, selecting a destination identity for an intended callee based upon the selection criteria and the caller preference; and providing a caller interface for the connection based upon the selected destination identity and automatically establishing the connection through the voice communication network associated with the selected destination identity.

2. The method of claim 1 wherein the plurality of different voice communication networks comprises two or more of a Public Switched Telephone Network (PSTN), a cellular telephone network, a corporate telephone network, a Voice over IP (VoIP) telephone service, an Instant Messenger (IM) based voice service, an Internet Protocol (IP) network, the Internet, a corporate Virtual Private Network (VPN), an IP-based application network that supports a voice call, a home network, a walkie-talkie network, a satellite network; and a push-to-talk network.

3. The method of claim 1 wherein a destination identity is established in relationship to the service priorities of the associated voice communication networks.

4. The method of claim 1 wherein the service priority is assigned by the caller.

5. In a voice communication system including a plurality of different voice communication services available to a caller and callee, apparatus for automatically establishing a connection between the caller and the callee over a caller selectable voice communication service through respective communication equipment, comprising:

a storage device containing a database maintained for the caller and accessible by the caller's communication equipment, the database associating a callee with a plurality of different voice communication networks accessible by the callee via a single telecommunication device and storing a caller profile comprising caller preferences associated with a caller;

a set of destination identities in the database for each callee, each destination identity being associated with a different voice communication network;

a destination identity selector operable to automatically select a destination identity for an intended callee based upon a set of pre-established selection criteria for each destination identity, the selection criteria selected from at least one of: a day of the week, a time of day, a service priority assigned by either the caller or the callee to each of the voice communication networks, and a geographic location of the caller and/or the intended callee, wherein the pre-established selection criteria are based on the caller preferences.

6. The apparatus of claim 5 further comprising a plurality of caller interfaces corresponding to different voice communication networks.

7. The apparatus of claim 6 wherein the caller interfaces include an interface for at least one of: a Public Switched Telephone Network (PSTN), a cellular telephone network, a corporate telephone network, a Voice over IP (VoIP) telephone service, an Instant Messenger (IM) based voice service, an Internet Protocol (IP) network, the Internet, a corporate Virtual Private Network (VPN), an IP-based application network that supports a voice call, a home network, a walkie-talkie network, a satellite network; and a push-to-talk network.

8. The apparatus of claim 5 constructed so that the destination identity selector is operable to select the destination identity in relationship to the service priorities of associated voice communication networks.

9. The apparatus of claim 8 constructed so that service priority is assigned by the caller.

10. The apparatus of claim 6, further comprising an interface selector for selecting one of the interfaces to provide the connection based upon the selected destination identity.

11. The apparatus of claim 10, further comprising a connection device connecting the selected interface to the voice communication network corresponding to the selected destination identity.

12. The apparatus of claim 5 wherein the plurality of voice communication networks comprises two or more of a Public Switched Telephone Network (PSTN), a cellular telephone network, a corporate telephone network, a Voice over IP (VoIP) telephone service, an Instant Messenger (IM) based voice service, an Internet Protocol (IP) network, the Internet, a corporate Virtual Private Network (VPN), an IP-based application network that supports a voice call, a home network, a walkie-talkie network, a satellite network; and a push-to-talk network.

13. The method of claim 1 wherein the single telecommunication device is a telephone.

14. The apparatus of claim 5 wherein the single telecommunication device is a telephone.

15. A telephone operable to automatically establish a connection between a caller and a callee over a caller selectable voice communication service wherein a plurality of different voice communication services are available to a caller and callee, the telephone comprising:

a computing module comprising a processor, a datastore associated with the processor, and a plurality of service modules, wherein each of the service modules is operable to interface with a different voice communication network, wherein the datastore is operable to store a set of destination identities for each callee, each destination identity being associated with a different voice communication network associating a callee with a plurality of different voice communication networks accessible by the callee via a single telecommunication device and wherein the datastore is operable to store a caller profile comprising caller preferences associated with a caller, the telephone further comprising a network module comprising a network interface for the plurality of service modules, an input module and an output module, wherein the computing module is operable to select one of the service modules and a stored destination identity such that the selected service module uses the selected destination identity to initiate a voice call to a callee via the network module, and wherein the computing module is operable to automatically select a destination identity for an intended callee based upon a set of pre-established selection criteria for each destination identity, the selection criteria selected from at least one of: a day of the week, a time of day, a service priority assigned by either the caller or the callee to each of the voice communication networks, and a geographic location of the caller and/or the intended callee, wherein the pre-established selection criteria are based on the caller preferences.

16. The telephone of claim 15 wherein the network module comprises an interface for at least one of: a Public Switched Telephone Network (PSTN), a cellular telephone network, a corporate telephone network, a Voice over IP (VoIP) telephone service, an Instant Messenger (IM) based voice service, an Internet Protocol (IP) network, the Internet, a corporate Virtual Private Network (VPN), an IP-based application network that supports a voice call, a home network, a walkie-talkie network, a satellite network and a push-to-talk network.

* * * * *